(12) United States Patent
Ozasa et al.

(10) Patent No.: US 11,710,603 B2
(45) Date of Patent: Jul. 25, 2023

(54) FILM CAPACITOR

(71) Applicant: Murata Manufacturing Co., Ltd., Nagaokakyo (JP)

(72) Inventors: Senichi Ozasa, Nishinomiya (JP); Takuya Sakamoto, Nishinomiya (JP); Tomomichi Ichikawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 389 days.

(21) Appl. No.: 16/918,403

(22) Filed: Jul. 1, 2020

(65) Prior Publication Data
US 2020/0335283 A1 Oct. 22, 2020

Related U.S. Application Data

(63) Continuation of application No. PCT/JP2018/047226, filed on Dec. 21, 2018.

(30) Foreign Application Priority Data

Feb. 5, 2018 (JP) ................. 2018-018222

(51) Int. Cl.
*H01G 4/33* (2006.01)
*H01G 4/008* (2006.01)

(52) U.S. Cl.
CPC ............ *H01G 4/33* (2013.01); *H01G 4/008* (2013.01)

(58) Field of Classification Search
CPC .................. H01G 4/33; H01G 4/008
(Continued)

(56) References Cited

U.S. PATENT DOCUMENTS 4,477,858 A * 10/1984 Steiner ................. H01G 4/008
361/273
5,757,607 A * 5/1998 Folli ..................... H01G 4/012
361/290
(Continued)

FOREIGN PATENT DOCUMENTS

JP H03122527 U 12/1991
JP H10303056 A 11/1998
(Continued)

OTHER PUBLICATIONS

International Search Report issued for PCT/JP2018/047226, dated Mar. 26, 2019.
(Continued)

*Primary Examiner* — Arun Ramaswamy
(74) *Attorney, Agent, or Firm* — ArentFox Schiff LLP

(57) ABSTRACT

A film capacitor that includes first and second dielectric films, first and second inner electrodes, and first and second outer electrodes. The first inner electrode includes a first connection portion, a first main electrode portion joined to the first connection portion and thinner than the first connection portion, and a first thin portion extending from the first main electrode portion and thinner than the first main electrode portion. The second inner electrode includes a second connection portion and a second main electrode portion joined to the second connection portion and thinner than the second connection portion. The first main electrode portion opposes the second main electrode portion across the first dielectric film. The second connection portion includes a reduction region having a thickness that decreases from the second connection portion toward the second main electrode portion. The first thin portion opposes the reduction region across the first dielectric film.

20 Claims, 7 Drawing Sheets

(58) Field of Classification Search
USPC ................ 361/303, 304, 301.4, 301.5, 306.3
See application file for complete search history.

(56) References Cited

U.S. PATENT DOCUMENTS

| | | | |
|---|---|---|---|
| 5,905,628 A * | 5/1999 | Okuno | H01G 4/012 |
| | | | 29/25.42 |
| 6,018,454 A | 1/2000 | Hatada et al. | |
| 6,222,721 B1 * | 4/2001 | Vetter | H01G 4/008 |
| | | | 361/311 |
| 7,027,286 B2 | 4/2006 | Shiota et al. | |
| 2006/0050467 A1 | 3/2006 | Shiota et al. | |
| 2008/0259522 A1 | 10/2008 | Okuno et al. | |

FOREIGN PATENT DOCUMENTS

| | | | |
|---|---|---|---|
| JP | 2004134561 A | 4/2004 | |
| JP | 2012222127 A | 11/2012 | |
| JP | 2013219094 A | 10/2013 | |
| JP | 2015106608 A * | 6/2015 | |
| WO | 2006112099 A1 | 10/2006 | |
| WO | 2013069485 A | 5/2013 | |
| WO | 2015041126 A1 | 3/2015 | |
| WO | WO-2016072671 A1 * | 5/2016 | ............... H01G 4/32 |

OTHER PUBLICATIONS

Written Opinion of the International Searching Authority issued for PCT/JP2018/047226, dated Mar. 26, 2019.

* cited by examiner

FILM CAPACITOR

CROSS REFERENCE TO RELATED APPLICATIONS

The present application is a continuation of International application No. PCT/JP2018/047226, filed Dec. 21, 2018, which claims priority to Japanese Patent Application No. 2018-018222, filed Feb. 5, 2018, the entire contents of each of which are incorporated herein by reference.

FIELD OF THE INVENTION

The present invention relates to a film capacitor.

BACKGROUND OF THE INVENTION

One type of capacitor is a film capacitor including one or more wound or laminated dielectric films, with a metal deposited film that serves as an inner electrode provided on a surface of each dielectric film.

A structure called a "heavy edge structure" is commonly employed in a film capacitor, as described in Patent Literature 1 and Patent Literature 2, in order to improve self-healing properties (properties to recover insulation through scattering of a metal deposited film upon discharge at an insulation defective portion). In the heavy edge structure, an inner electrode in a capacitance forming portion (hereinafter, such an inner electrode is also referred to as a "main electrode portion") is made thinner while an inner electrode at each of portions connected to outer electrodes at both ends of the film capacitor (hereinafter, such an inner electrode is also referred to as a "connection portion") is made thicker.

As described in Patent Literature 1 and Patent Literature 2, another structure has also been suggested in which an inner electrode is divided into multiple split electrodes by slits not containing a metal, and the split electrodes are connected in parallel by fuses formed between the slits. This structure provides a self-security function that blows fuses around an insulation defective portion by a short-circuit current during self recovery so as to cut off the insulation defective portion from an electric circuit.

While polypropylene (PP) has been used as a material of dielectric films defining a film capacitor, use of a thermosetting resin having a high heat resistance is also known as described in Patent Literature 3.

Patent Literature 1: JP 2013-219094 A
Patent Literature 2: JP 2004-134561 A
Patent Literature 3: WO 2013/069485

SUMMARY OF THE INVENTION

FIG. 1 of Patent Literature 1 shows a structure in which an end of a main electrode portion defining one inner electrode (i.e., a boundary portion between the main electrode portion and an insulation margin) opposes a connection portion defining the other inner electrode across a dielectric film. Unfortunately, discharge may occur frequently due to electric field concentration, causing dielectric breakdown, at a portion where the end of the main electrode portion defining one inner electrode overlaps the connection portion defining the other inner electrode. In particular, use of a thermosetting resin as described in Patent Literature 3 as a material of dielectric films results in poor self-healing properties and thus easily causes dielectric breakdown, as compared to use of a conventional PP film.

One possible countermeasure is a structure shown in FIG. 3 of Patent Literature 2 in which the width of the connection portion is made narrow, so that the end of the main electrode portion defining one inner electrode does not oppose the connection portion defining the other inner electrode across a dielectric film. In such a structure, however, the connection between the connection portion and the outer electrode is insufficient because the connection portion has a narrow width, which may reduce the current resistance.

The present invention was made to solve the above problems, and aims to provide a film capacitor having excellent self-healing properties and capable of preventing or reducing the occurrence of dielectric breakdown.

A first aspect of the present invention provides a film capacitor including: a first dielectric film having a first side and a second side opposite to the first side; a second dielectric film having a first side and a second side opposite to the first side, the second dielectric film being arranged such that the first side of the second dielectric film opposes the second side of the first dielectric film; a first inner electrode on the first side of the first dielectric film, the first inner electrode including a first connection portion, a first main electrode portion joined to the first connection portion and thinner than the first connection portion, and a first thin portion extending from the first main electrode portion and thinner than the first main electrode portion; a second inner electrode between the first dielectric film and the second dielectric film, the second inner electrode including a second connection portion and a second main electrode portion joined to the second connection portion and thinner than the second connection portion, the second connection portion including a reduction region having a thickness that decreases from the second connection portion toward the second main electrode portion; a first outer electrode on a first end face of a laminate of the first dielectric film and the second dielectric film, the first outer electrode being electrically connected to the first connection portion of the first inner electrode and spaced apart from the second inner electrode; and a second outer electrode on a second end face of the laminate, the second outer electrode being electrically connected to the second connection portion of the second inner electrode and spaced apart from the first inner electrode. The first main electrode portion opposes the second main electrode portion across the first dielectric film, and the first thin portion opposes the reduction region of the second connection portion across the first dielectric film.

In the first aspect, preferably, the second inner electrode further includes a second thin portion extending from the second main electrode portion toward the first outer electrode and thinner than the second main electrode portion, the first connection portion includes a reduction region having a thickness that decreases from the first outer electrode toward the first main electrode portion, and the second thin portion opposes the reduction region of the first connection portion across the first dielectric film.

Preferably, a cross section of the reduction region of the second connection portion in a lamination direction of the first dielectric film and the second dielectric film has a tapered shape.

Preferably, a cross section of the first thin portion in the lamination direction of the first dielectric film and the second dielectric film has a tapered shape in which a thickness thereof decreases from the first main electrode portion toward the second outer electrode.

Preferably, a maximum total thickness of the reduction region of the second connection portion and the first thin portion opposing each other across the first dielectric film is smaller than a difference between a maximum thickness of the second connection portion and a maximum thickness of the second main electrode portion.

Preferably, the second connection portion opposing an end of the first thin portion closest to the second outer electrode has a thickness that is more than one time and not more than two times the maximum thickness of the second main electrode portion.

Preferably, the reduction region of the second connection portion is longer than the first thin portion in a direction from the first outer electrode toward the second outer electrode.

Preferably, the first thin portion is within the reduction region of the second connection portion when viewed from the lamination direction of the first dielectric film and the second dielectric film.

Preferably, the second connection portion is made of a material having a lower electrical conductivity than a material of the first thin portion.

Preferably, the second inner electrode is on the first side of the second dielectric film, and the second connection portion is configured such that a side thereof opposing the first thin portion across the first dielectric film is made of a material having a lower electrical conductivity than a material of a side thereof opposing the second dielectric film.

Preferably, the second connection portion is made of a material containing zinc as a main component thereof, and the first thin portion is made of a material containing aluminum as a main component thereof.

Preferably, the first dielectric film contains a first curable resin as a main component thereof, and the second dielectric film contains a second curable resin as a main component thereof.

A second aspect of the present invention provides a film capacitor including: a first dielectric film having a first side and a second side opposite to the first side; a second dielectric film having a first side and a second side opposite to the first side, the second dielectric film being arranged such that the first side of the second dielectric film opposes the second side of the first dielectric film; a first inner electrode on the first side of the first dielectric film, the first inner electrode including a first main electrode portion and a first thin portion extending from the first main electrode portion and thinner than the first main electrode portion; a second inner electrode between the first dielectric film and the second dielectric film, the second inner electrode including a first connection portion, a second main electrode portion joined to the first connection portion and thinner than the first connection portion, a second connection portion, and a third main electrode portion spaced apart from the second main electrode portion and joined to the second connection portion and thinner than the second connection portion, the second connection portion including a reduction region having a thickness that decreases from the second connection portion toward the third main electrode portion; a first outer electrode a first end face of a laminate of the first dielectric film and the second dielectric film, the first outer electrode being electrically connected to the first connection portion of the second inner electrode and spaced apart from the first inner electrode; and a second outer electrode on a second end face of the laminate, the second outer electrode being electrically connected to the second connection portion of the second inner electrode and spaced apart from the first inner electrode. The first main electrode portion opposes the second main electrode portion and the third main electrode portion across the first dielectric film, and the first thin portion opposes the reduction region of the second connection portion across the first dielectric film.

In the second aspect, preferably, the first inner electrode further includes a second thin portion extending from the first main electrode portion toward the first outer electrode and thinner than the first main electrode portion, the first connection portion includes a reduction region having a thickness that decreases from the first outer electrode toward the second main electrode portion, and the second thin portion opposes the reduction region of the first connection portion across the first dielectric film.

The present invention can provide a film capacitor having excellent self-healing properties and capable of preventing or reducing the occurrence of dielectric breakdown.

DETAILED DESCRIPTION OF THE PREFERRED EMBODIMENTS

The film capacitor of the present invention is described below.

The present invention is not limited to the following preferred embodiments, and may be suitably modified without departing from the gist of the present invention.

Combinations of two or more preferred features described in the following preferred embodiments are also within the scope of the present invention.

In the film capacitor of the present invention, the thin portion of the first inner electrode opposes the reduction region of the connection portion of the second inner electrode across the first dielectric film. Specifically, both the first inner electrode and the connection portion of the second inner electrode are made thin at a portion where an end of the first inner electrode overlaps the connection portion of the second inner electrode. Thus, the film capacitor can self-recover and prevent or reduce the occurrence of dielectric breakdown even when discharge occurs frequently at the portion.

The following preferred embodiments are examples, and features of different preferred embodiments can be partially exchanged or combined with each other. In the second preferred embodiment and subsequent preferred embodiments, descriptions of features common to the first preferred embodiment are omitted and only different points are described. In particular, similar advantageous effects by similar features are not mentioned in each preferred embodiment.

The film capacitor of the present invention may be a wound film capacitor including one or more wound dielectric films in a laminated state, with an inner electrode on a surface of each dielectric film, or may be a laminated film capacitor including one or more laminated dielectric films, with an inner electrode on a surface of each dielectric film.

When the film capacitor of the present invention is a wound film capacitor, a wound body of the dielectric films may be pressed into a flat shape having an oval or oblong cross section to have a more compact shape. When the film capacitor of the present invention is a wound film capacitor, the capacitor may include a cylindrical winding shaft. The winding shaft is arranged on the central axis of the dielectric films being wound, and serves as a spool for winding the dielectric films.

First Embodiment

In the film capacitor according to the first embodiment of the present invention, the first outer electrode is connected to the first inner electrode and spaced apart from the second inner electrode, and the second outer electrode is connected to the second inner electrode and spaced apart from the first inner electrode. In the first embodiment, the second inner electrode is provided on the first side of the second dielectric film.

Figure 1:
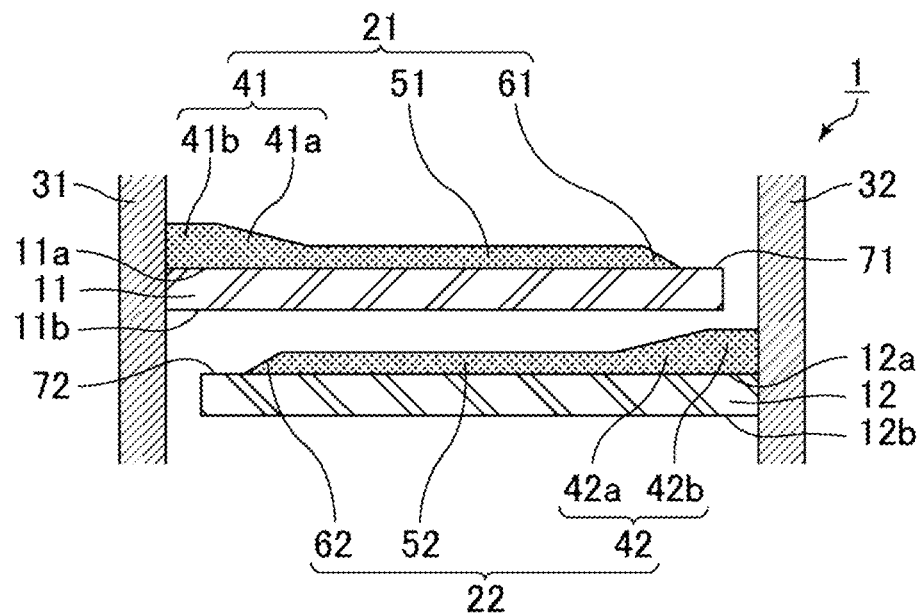
FIG. 1 is a schematic cross-sectional view of an example of a film capacitor according to a first embodiment of the present invention.
Figure 2:
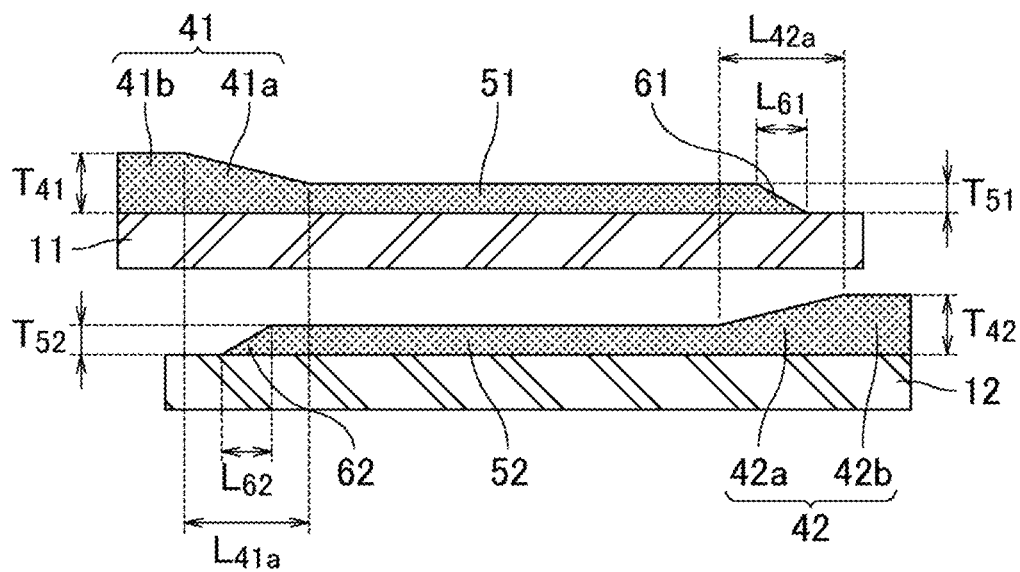
FIG. 2 is an enlarged view of a portion of the film capacitor shown in FIG. 1 excluding a first outer electrode and a second outer electrode.
Figure 3:
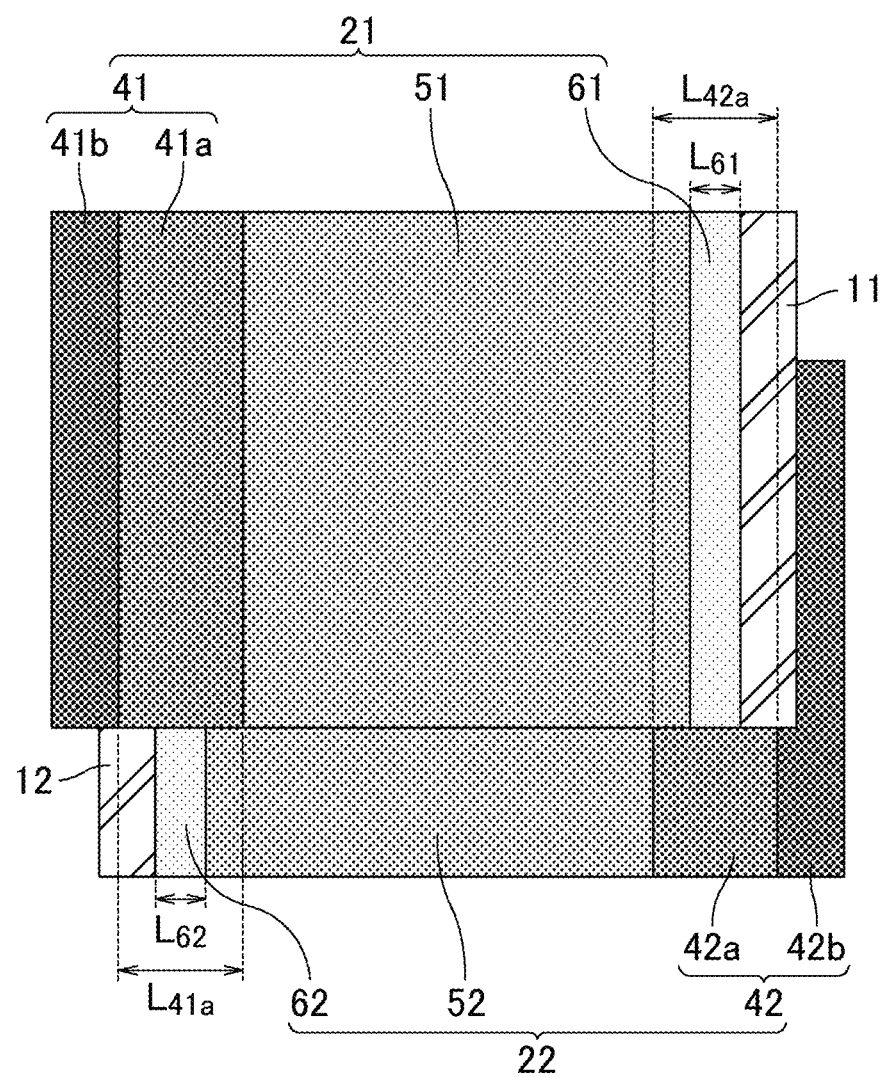
FIG. 3 is a schematic plan view of an example of the first inner electrode and the second inner electrode defining the film capacitor shown in FIG. 1.

FIG. 1 is a schematic cross-sectional view of an example of the film capacitor according to the first embodiment of the present invention. FIG. 2 is an enlarged view of a portion of the film capacitor shown in FIG. 1 excluding the first outer electrode and the second outer electrode. FIG. 3 is a schematic plan view of an example of the first inner electrode and the second inner electrode defining the film capacitor shown in FIG. 1.

For convenience, FIG. 1 shows a first dielectric film 11 and a second dielectric film 12 spaced apart from each other. Yet, in an actual film capacitor, the first dielectric film is superimposed on the second dielectric film without a gap.

Although an overall configuration is not shown in FIG. 1, a film capacitor 1 includes the first dielectric film 11, the second dielectric film 12 laminated on the first dielectric film 11, and a first inner electrode 21 and a second inner electrode 22 opposing each other across the first dielectric film 11. The film capacitor 1 further includes a first outer electrode 31 connected to the first inner electrode 21 and spaced apart from the second inner electrode 22, and a second outer electrode 32 connected to the second inner electrode 22 and spaced apart from the first inner electrode 21.

Figure 4:
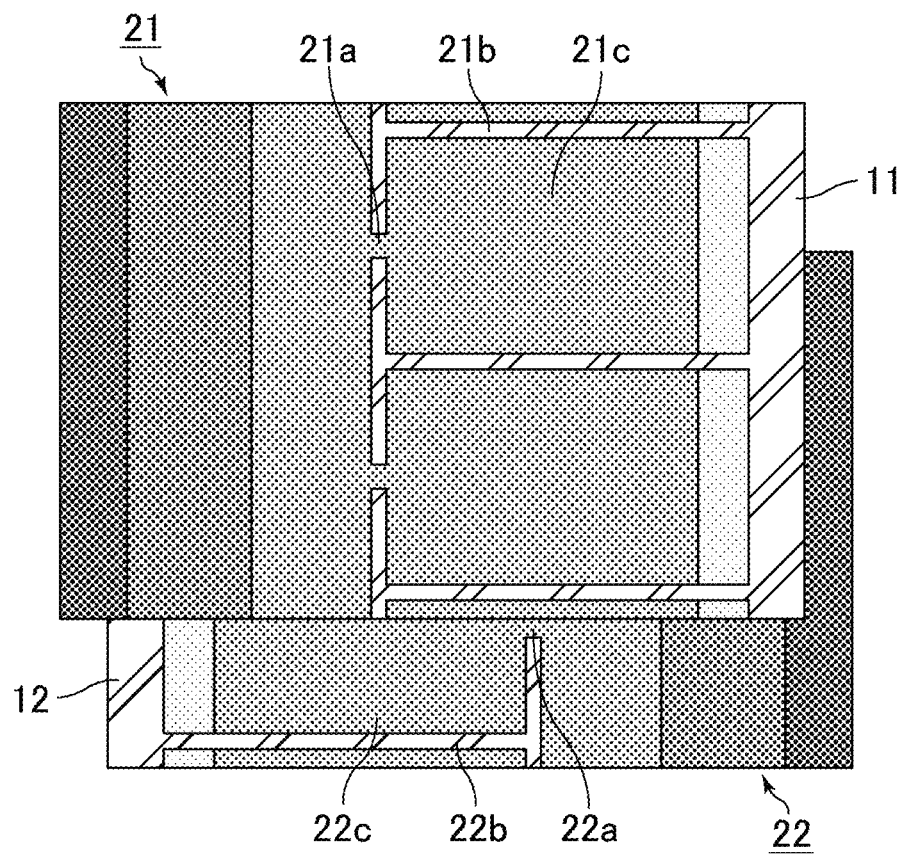
FIG. 4 is a schematic plan view of another example of the first inner electrode and the second inner electrode defining the film capacitor shown in FIG. 1.

FIG. 4 is a schematic plan view of another example of the first inner electrode and the second inner electrode defining the film capacitor shown in FIG. 1.

As shown in FIG. 4, the first inner electrode 21 may include fuse portions 21a where the electrode is partially made thin and split electrodes 21c are separated by insulation slits 21b. Likewise, the second inner electrode 22 may include fuse portions 22a where the electrode is partially made thin and split electrodes 22c are separated by insulation slits 22b.

In the film capacitor 1 shown in FIG. 1, the first dielectric film 11 has a first side 11a and a second side 11b opposite to the first side 11a. Likewise, the second dielectric film 12 has a first side 12a and a second side 12b opposite to the first side 12a. The first dielectric film 11 and the second dielectric film 12 are laminated in such a manner that the second side 11b of the first dielectric film 11 opposes the first side 12a of the second dielectric film 12.

The first inner electrode 21 is provided on the first side 11a of the first dielectric film 11. The first inner electrode 21 reaches one edge of the first side 11a of the first dielectric film 11 but does not reach the other edge thereof. Thus, an insulation margin 71 without the first inner electrode 21 is provided at the other edge of the first side 11a of the first dielectric film 11.

The second inner electrode 22 is provided on the first side 12a of the second dielectric film 12. The second inner electrode 22 does not reach one edge of the first side 12a of the second dielectric film 12 but reaches the other edge thereof. Thus, there is an insulation margin 72 where the second inner electrode 22 is not provided at one edge of the first side 12a of the second dielectric film 12.

In FIG. 1, the first dielectric film 11 and the second dielectric film 12 are laminated while they are displaced from each other in a width direction (a right-to-left direction in FIG. 1) in such a manner that the end of the first inner electrode 21 on the side reaching the edge of the first dielectric film 11 and the end of the second inner electrode 22 on the side reaching the edge of the second dielectric film 12 are both exposed at the laminated films. When the film capacitor 1 shown in FIG. 1 is a wound film capacitor, the first dielectric film 11 and the second dielectric film 12 are wound in a laminated state, so that these films are laminated while they maintain a state in which the ends of the first inner electrode 21 and the second inner electrode 22 are exposed.

The first outer electrode 31 and the second outer electrode 32 are formed by, for example, thermally spraying zinc or the like onto each end face of the laminate obtained as described above. The first outer electrode 31 is in contact with the exposed end of the first inner electrode 21, and is thus electrically connected to the first inner electrode 21. The second outer electrode 32 is in contact with the exposed end of the second inner electrode 22, and is thus electrically connected to the second inner electrode 22.

The first inner electrode 21 includes a first connection portion 41 connected to the first outer electrode 31, a first main electrode portion 51 joined to the first connection portion 41, and a first thin portion 61 extending from the first main electrode portion 51 toward the second outer electrode 32. The first connection portion 41 includes a reduction region 41a where the thickness decreases from the first outer electrode 31 toward the first main electrode portion 51, and a flat region 41b where the thickness is constant. The reduction region 41a of the first connection portion 41 has a tapered shape. The first main electrode portion 51 is thinner than the first connection portion 41. The first thin portion 61 is thinner than the first main electrode portion 51, and has a tapered shape in which the thickness decreases from the first main electrode portion 51 toward the second outer electrode 32.

The second inner electrode 22 includes a second connection portion 42 connected to the second outer electrode 32, a second main electrode portion 52 joined to the second connection portion 42, and a second thin portion 62 extending from the second main electrode portion 52 toward the first outer electrode 31. The second connection portion 42 includes a reduction region 42a where the thickness decreases from the second outer electrode 32 toward the second main electrode portion 52, and a flat region 42b where the thickness is constant. The reduction region 42a of the second connection portion 42 has a tapered shape. The second main electrode portion 52 is thinner than the second connection portion 42. The second thin portion 62 is thinner than the second main electrode portion 52, and has a tapered shape in which the thickness decreases from the second main electrode portion 52 toward the first outer electrode 31.

In the first inner electrode 21, the first main electrode portion 51 opposes the second main electrode portion 52 across the first dielectric film 11 in a thickness direction of the first dielectric film 11. The first thin portion 61 opposes the reduction region 42a of the second connection portion 42 across the first dielectric film 11 in the thickness direction of the first dielectric film 11.

In the second inner electrode 22, the second thin portion 62 opposes the reduction region 41a of the first connection portion 41 across the first dielectric film 11 in the thickness direction of the first dielectric film 11.

Preferably, the first inner electrode 21 is formed by the following method. The second inner electrode 22 is also formed by a similar method.

Figure 5A:
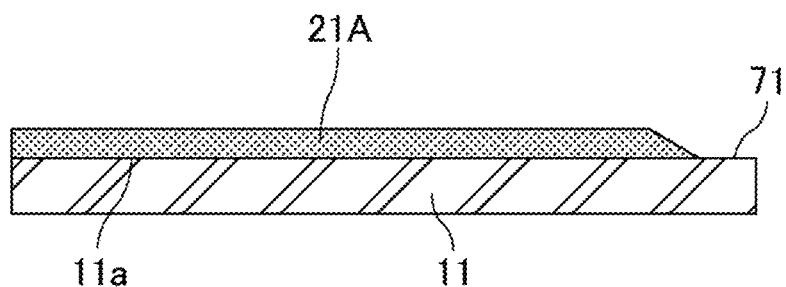
FIG. 5A and FIG. 5B are each a schematic cross-sectional view of an example of a method of forming the first inner electrode.
Figure 5B:
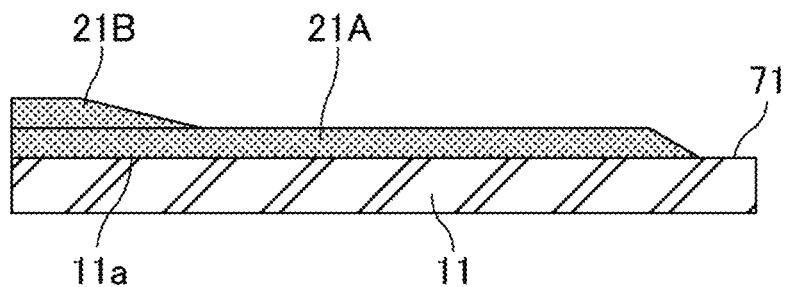

FIG. 5A and FIG. 5B are each a schematic cross-sectional view of an example of a method of forming the first inner electrode.

First, as shown in FIG. 5A, a metal such as aluminum is vapor-deposited on the first side 11a of the first dielectric film 11 while the insulation margin 71 is formed by means of a non-vapor deposited portion on the other edge. Thus, a first metal deposited film 21A is formed. When forming the first metal deposited film 21A, the amount of metal vapor is decreased from the thicker side to the thinner side of the film, whereby a portion that serves as the first thin portion can be formed. For example, when the first thin portion has a tapered shape, a method such as adjusting the shape of a mask on a metal evaporation source side or adjusting the distance between the mask and the film may be employed. Subsequently, as shown in FIG. 5B, a metal such as zinc is vapor-deposited on the first metal deposited film 21A on one edge side of the first side 11a of the first dielectric film 11, whereby a second metal deposited film 21B is formed. When forming the second metal deposited film 21B, the amount of metal vapor is decreased from the thicker side to the thinner side of the film, whereby a portion that serves as the reduction region can be formed. For example, when the reduction region has a tapered shape, a method such as adjusting the distance between a jet nozzle on the metal evaporation source side and the film may be employed. Preferably, the second metal deposited film 21B is thicker than the first metal deposited film 21A. As a result, the first connection portion is formed on one edge side of the first side 11a of the first dielectric film 11.

When the first inner electrode is formed by the method described above, preferably, the first connection portion is made of a material containing zinc as a main component, and the first main electrode portion and the first thin portion are made of a material containing aluminum as a main component. Likewise, when the second inner electrode is formed by the method described above, preferably, the second connection portion is made of a component containing zinc as a main component, and the second main electrode portion and the second thin portion are made of a component containing aluminum as a main component.

The term "main component" as used herein refers to a component with the highest proportion (wt %), and preferably refers to a component whose proportion is more than 50 wt %.

In the film capacitor 1 shown in FIG. 1, the reduction region 41a of the first connection portion 41 has a linear tapered shape without a step, but the shape of the reduction region of the first connection portion is not limited as long as the thickness decreases from the first outer electrode 31 toward the first main electrode portion 51. Likewise, in the film capacitor 1 shown in FIG. 1, the reduction region 42a of the second connection portion 42 has a linear tapered shape without a step, but the shape of the reduction region of the second connection portion is not limited as long as the thickness decrease from the second outer electrode 32 toward the second main electrode portion 52. The shape of the reduction region of the second connection portion may be the same as or different from the shape of the reduction region of the first connection portion. The shape of the second connection portion may be the same as or different from the shape of the first connection portion.

FIG. 6A, FIG. 6B, FIG. 6C, FIG. 6D, and FIG. 6E are schematic cross-sectional views of other examples of the first connection portion.

Figure 6A:
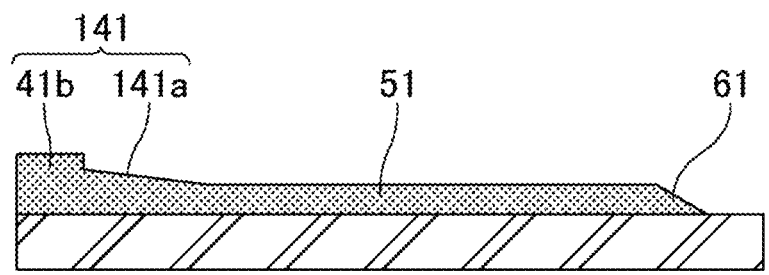
FIG. 6A, FIG. 6B, FIG. 6C, FIG. 6D, and FIG. 6E are schematic cross-sectional views of other examples of the first connection portion.
Figure 6B:
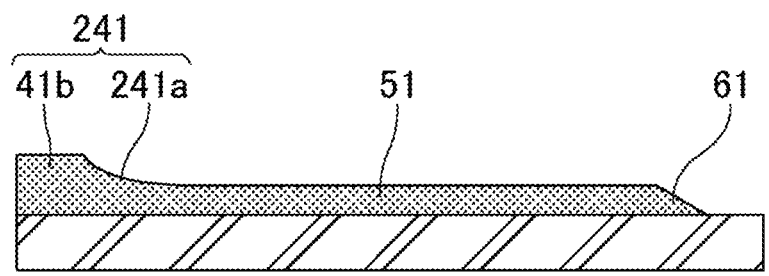
Figure 6C:
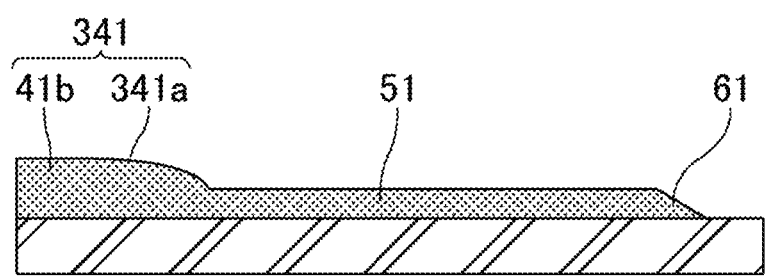
Figure 6D:
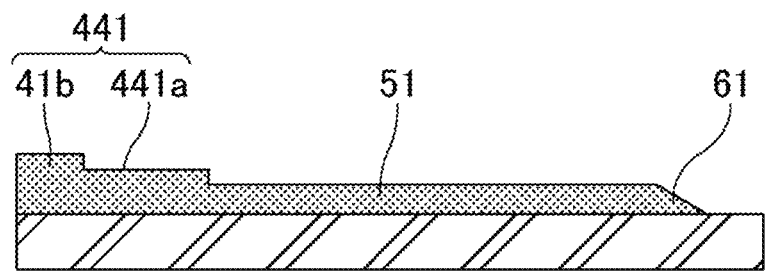
Figure 6E:
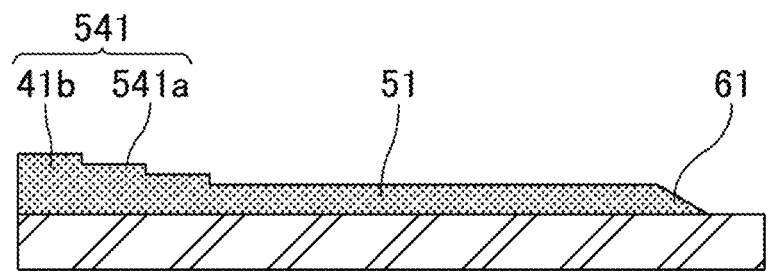

A reduction region 141a of a first connection portion 141 shown in FIG. 6A, a reduction region 241a of a first connection portion 241 shown in FIG. 6B, and a reduction region 341a of a first connection portion 341 shown in FIG. 6C each have a tapered shape in which the thickness decreases from the first outer electrode (not shown) toward the first main electrode portion 51. Of these, the reduction region 141a of the first connection portion 141 shown in FIG. 6A has a linear tapered shape with a step, the reduction region 241a of the first connection portion 241 shown in FIG. 6B has a curved tapered shape that is convex downward relative to the first main electrode portion 51, and the reduction region 341a of the first connection portion 341 shown in FIG. 6C has a tapered shape that is convex upward relative to the first main electrode portion 51. A reduction region 441a of a first connection portion 441 shown in FIG. 6D has a flat shape, and a reduction region 541a of a first connection portion 541 shown in FIG. 6E has a stepped shape.

In the film capacitor 1 shown in FIG. 1, the first thin portion 61 has a linear tapered shape without a step, but the shape of the first thin portion is not limited as long as it is thinner than the first main electrode portion 51. Likewise, in the film capacitor 1 shown in FIG. 1, the second thin portion 62 has a linear tapered shape without a step, but the shape of the second thin portion is not limited as long as it is thinner than the second main electrode portion 52. The shape of the second thin portion may be the same as or different from the shape of the first thin portion.

FIG. 7A, FIG. 7B, FIG. 7C, FIG. 7D, and FIG. 7E are schematic cross-sectional views of other examples of the first thin portion.

Figure 7A:
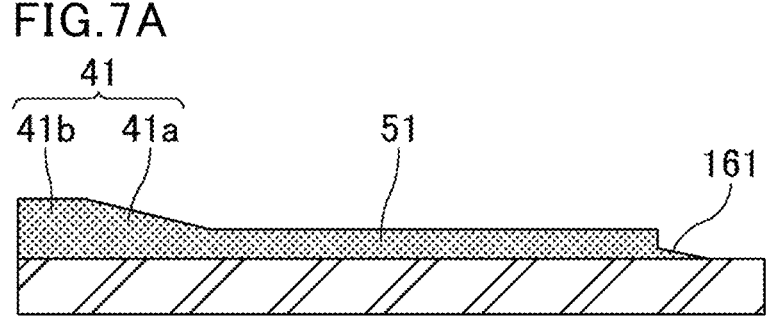
FIG. 7A, FIG. 7B, FIG. 7C, FIG. 7D, and FIG. 7E are schematic cross-sectional views of other examples of the first thin portion.
Figure 7B:
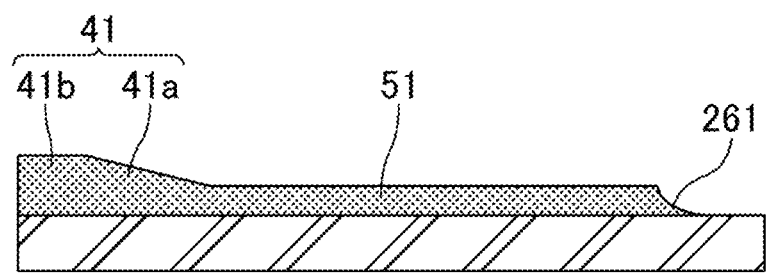
Figure 7C:
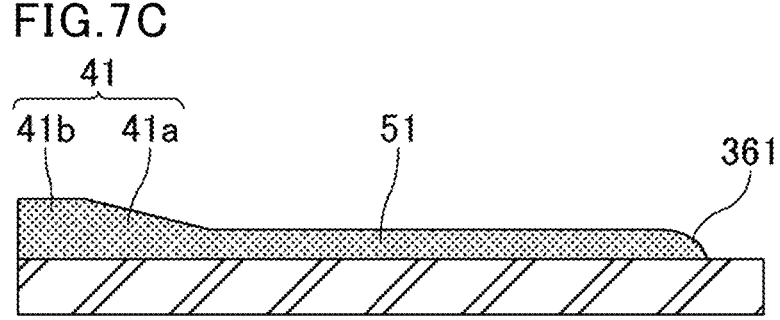
Figure 7D:
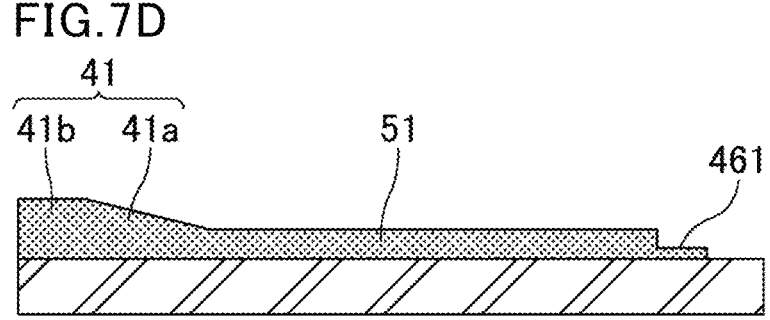
Figure 7E:
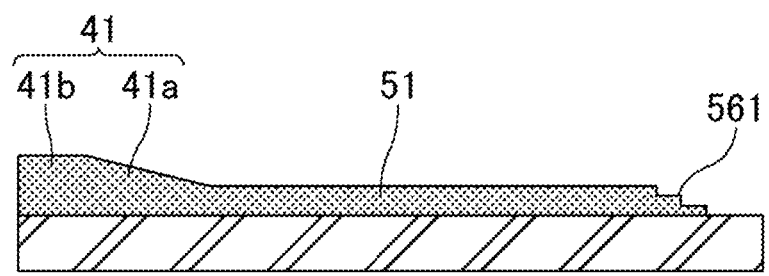

A first thin portion 161 shown in FIG. 7A, a first thin portion 261 shown in FIG. 7B, and a first thin portion 361 shown in FIG. 7C each have a tapered shape in which the thickness decreases from the first main electrode portion 51 toward the second outer electrode (not shown). Of these, the first thin portion 161 shown in FIG. 7A has a linear tapered shape with a step, the first thin portion 261 shown in FIG. 7B has a curved shape that is convex downward relative to the first main electrode portion 51, and the first thin portion 361 shown in FIG. 7C has a curved tapered shape that is convex upward relative to the first main electrode portion 51. A first thin portion 461 shown in FIG. 7D has a flat shape, and a first thin portion 561 shown in FIG. 7E has a stepped shape.

As has been described above, in the film capacitor according to the first embodiment of the present invention, the first inner electrode includes the first thin portion, and the first thin portion opposes the reduction region of the second connection portion across the first dielectric film.

In the film capacitor according to the first embodiment of the present invention, the second inner electrode may not include the second thin portion, but preferably, the second inner electrode includes the second thin portion, and the second thin portion opposes the reduction region of the first connection portion across the first dielectric film. Dielectric breakdown can be further prevented or reduced by not only providing the first thin portion to the first inner electrode but also by providing the second thin portion to the second inner electrode.

In the film capacitor according to the first embodiment of the present invention, preferably, the second connection portion is made of a material having a low electrical conductivity as compared to the first thin portion. Specifically, preferably, the second connection portion is made of a material containing zinc as a main component, and the first thin portion is made of a material containing aluminum as a main component.

When the first inner electrode and the second inner electrode are formed by the method as shown in FIG. 5A and FIG. 5B, preferably, the second connection portion is configured such that a side opposing the first thin portion across the first dielectric film (a portion corresponding to the second metal deposited film 21B in FIG. 5B) is made of a material having a low electrical conductivity as compared to a side opposing the second dielectric film (a portion corresponding to the first metal deposited film 21A in FIG. 5B). Specifically, preferably, the second connection portion is configured such that the side opposing the first thin portion across the first dielectric film is made of a material containing zinc as a main component and the side opposing the second dielectric film is made of a material containing aluminum as a main component.

In the film capacitor according to the first embodiment of the present invention, when the second inner electrode includes the second thin portion, preferably, the first connection portion is made of a material having a low electrical conductivity as compared to the second thin portion. Specifically, preferably, the first connection portion is made of a material containing zinc as a main component, and the second thin portion is made of a material containing aluminum as a main component.

When the first inner electrode and the second inner electrode are formed by the methods as shown in FIG. 5A and FIG. 5B, preferably, the first connection portion is configured such that a side opposite to a side opposing the second thin portion across the first dielectric film (a portion corresponding to the second metal deposited film 21B in FIG. 5B) is made of a material having a low electrical conductivity as compared to the side opposing the second thin portion across the first dielectric film (a portion corresponding to the first metal deposited film 21A in FIG. 5B). Specifically, preferably, the first connection portion is configured such that the portion on the side opposite to the side opposing the second thin portion across the first dielectric film is made of a material containing zinc as a main component, and the portion on the side opposing the second thin portion across the first dielectric film is made of a component containing aluminum as a main component.

In the film capacitor according to the first embodiment of the present invention, preferably, the maximum total thickness of the reduction region of the second connection portion and the first thin portion opposing each other across the first dielectric film is smaller than the difference between the maximum thickness of the second connection portion (the length indicated by $T_{42}$ in FIG. 2) and the maximum thickness of the second main electrode portion (the length indicated by $T_{52}$ in FIG. 2).

In the film capacitor according to the first embodiment of the present invention, when the second inner electrode includes the second thin portion, preferably, the maximum total thickness of the reduction region of the first connection portion and the second thin portion opposing each other across the first dielectric film is smaller than the difference between the maximum thickness of the first connection portion (the length indicated by $T_{41}$ in FIG. 2) and the maximum thickness of the first main electrode portion (the length indicated by $T_{51}$ in FIG. 2).

The total thickness of the reduction region of the connection portion and the opposing thin portion is made smaller than the difference between the maximum thickness of the connection portion and the maximum thickness of the main electrode portion, whereby deformation at the ends of the capacitor element can be prevented or reduced.

The thickness of the inner electrode can be determined through observation of a cross section of the inner electrode in the thickness direction with an electronic microscope such as a field emission scanning electron microscope (FE-SEM).

In the film capacitor according to the first embodiment of the present invention, preferably, the second connection portion opposing an end of the first thin portion closer to the second outer electrode has a thickness that is more than one time and not more than two times the maximum thickness $T_{52}$ of the second main electrode portion.

In the film capacitor according to the first embodiment of the present invention, when the second inner electrode includes the second thin portion, preferably, the thickness of the first connection portion opposing an end of the second thin portion closer to the first outer electrode is more than one time and not more than two times the maximum thickness $T_{51}$ of the first main electrode portion.

When the total thickness of the thin portion and the opposing connection portion is more than one time the maximum thickness of the main electrode portion, the current resistance is maintained. When the total thickness is not more than two times the maximum thickness of the main electrode portion, dielectric breakdown can be prevented or reduced even when discharge occurs frequently at a portion where the end of one inner electrode overlaps the connection portion of the other inner electrode.

In the film capacitor according to the first embodiment of the present invention, preferably, the reduction region of the second connection portion is longer than the first thin portion in a direction from the first outer electrode toward the second outer electrode. In particular, preferably, the first thin portion fits within the reduction region of the second connection portion when viewed from a lamination direction of the first dielectric film and the second dielectric film. Specifically, preferably, the first thin portion opposes only the reduction region of the second connection portion across the first dielectric film and does not oppose either the flat region of the second connection portion or the second main electrode portion across the first dielectric film.

In FIG. 2 and FIG. 3, the length of the reduction region of the second connection portion is indicated by $L_{42a}$, and the length of the first thin portion is indicated by $L_{61}$.

In the film capacitor according to the first embodiment of the present invention, when the second inner electrode includes the second thin portion, preferably, the reduction region of the first connection portion is longer than the second thin portion in the direction from the first outer electrode toward the second outer electrode. In particular, preferably, the second thin portion fits within the reduction region of the first connection portion when viewed in the lamination direction of the first dielectric film and the second dielectric film. Specifically, preferably, the second thin portion opposes only the reduction region of the first connection portion across the first dielectric film and does not oppose either the flat region of the first connection portion or the first main electrode portion across the first dielectric film.

In FIG. 2 and FIG. 3, the length of the reduction region of the first connection portion is indicated by $L_{41a}$, and the length of the second thin portion is indicated by $L_{62}$.

The length of the inner electrode can be determined through observation of a cross section of the inner electrode in the thickness direction with an electronic microscope such as a field emission scanning electron microscope (FE-SEM).

In the film capacitor according to the first embodiment of the present invention, preferably, the length $L_{42a}$ of the reduction region of the second connection portion in the direction from the first outer electrode toward the second outer electrode is greater than the difference between the maximum thickness $T_{42}$ of the second connection portion and the maximum thickness $T_{52}$ of the second main electrode portion.

In this case, preferably, the length $L_{42a}$ of the reduction region of the second connection portion is at least 10,000 times the difference between the maximum thickness $T_{42}$ of the second connection portion and the maximum thickness $T_{52}$ of the second main electrode portion.

In the film capacitor according to the first embodiment of the present invention, when the second inner electrode includes the second thin portion, preferably, the length $L_{41a}$ of the reduction region of the first connection portion in the direction from the first outer electrode toward the second outer electrode is greater than the difference between the maximum thickness $T_{41}$ of the first connection portion and the maximum thickness $T_{51}$ of the first main electrode portion.

In this case, preferably, the length $L_{41a}$ of the reduction region of the first connection portion is at least 10,000 times the difference between the maximum thickness $T_{41}$ of the first connection portion and the maximum thickness $T_{51}$ of the first main electrode portion.

In the film capacitor according to the first embodiment of the present invention, preferably, the length $L_{61}$ of the first thin portion in the direction from the first outer electrode toward the second outer electrode is greater than the maximum thickness $T_{51}$ of the first main electrode portion.

In this case, preferably, the length $L_{61}$ of the first thin portion is at least 10,000 times the maximum thickness $T_{51}$ of the first main electrode portion.

In the film capacitor according to the first embodiment of the present invention, when the second inner electrode includes the second thin portion, preferably, the length $L_{62}$ of the second thin portion in the direction from the first outer electrode toward the second outer electrode is greater than the maximum thickness $T_{52}$ of the second main electrode portion.

In this case, preferably, the length $L_{62}$ of the second thin portion is at least 10,000 times the maximum thickness $T_{52}$ of the second main electrode portion.

In the film capacitor according to the first embodiment of the present invention, the first dielectric film may contain a curable resin such as a thermosetting resin as a main component or may contain a thermoplastic resin as a main component. Likewise, the second dielectric film may contain a curable resin as a main component or a thermoplastic resin as a main component. The second dielectric film may have a configuration different from that of the first dielectric film, but preferably, it has the same configuration as that of the first dielectric film.

Preferably, the first dielectric film contains a curable resin as a main component, and preferably, the second dielectric film contains a curable resin as a main component. In particular, preferably, the first dielectric film contains a thermosetting resin as a main component, and preferably, the second dielectric film contains a thermosetting resin as a main component.

The film capacitor according to the first embodiment of the present invention easily self-recovers and prevents or reduces dielectric breakdown even when a curable resin such as a thermosetting resin that is more thermally stable than PP is used as a material of the dielectric films. Thus, a capacitor having a high reliability and a high heat resistance can be provided.

Hereinafter, the first dielectric film and the second dielectric film are simply referred to as "dielectric films" when no distinction is made therebetween.

As described above, the term "main component" refers to a component with the highest proportion (wt %), and preferably refers to a component whose proportion is more than 50 wt %. Thus, the dielectric films may contain other components in addition to the main component. Examples of the other components include additives such as silicone resin, and uncured residues of starting materials such as a first organic material and a second organic material which are described later.

When the dielectric films contain a curable resin as a main component, the curable resin may be a thermosetting resin or a photocurable resin. The curable resin may or may not contain at least one of a urethane bond or a urea bond.

The presence of a urethane bond and/or a urea bond can be confirmed using a Fourier transform infrared (FT-IR) spectrophotometer.

The term "thermosetting resin" as used herein refers to a heat-curable resin, and the curing method is not limited. Thus, the thermosetting resin encompasses a resin cured by a method other than heat (such as light or electron beam) as long as the resin is heat curable. Some materials may start a reaction due to their own reactivity. The thermosetting resin also includes such materials that do not necessarily require external heat, light, or the like to start curing. The same applies to the photocurable resins, and the curing method is not limited.

The dielectric films may include a vapor-deposited polymer film as a main component. The vapor-deposited polymer film may or may not contain at least one of a urethane bond or a urea bond. Basically, the vapor-deposited polymer film is encompassed by the curable resin.

Preferably, the dielectric films are made of a cured product of the first organic material and the second organic material. Examples thereof include a cured product obtained by a reaction between a hydroxyl group (OH group) of the first organic material and an isocyanate group (NCO group) of the second organic material.

When a cured product is obtained by the above reaction, the resulting films may contain uncured residues of the starting materials. For example, the dielectric films may contain at least one of an isocyanate group (NCO group) or a hydroxyl group (OH group). In this case, the dielectric films may contain either one or both of an isocyanate group and a hydroxyl group.

The presence of an isocyanate group and/or a hydroxyl group can be confirmed using a Fourier transform infrared (FT-IR) spectrophotometer.

Preferably, the first organic material is a polyol having two or more hydroxyl groups (OH groups) in the molecule. Examples of the polyol include polyether polyols, polyester polyols, and polyvinyl acetoacetal. The first organic material may be any combination of two or more organic materials. The first organic material is preferably a phenoxy resin belonging to polyether polyols.

The second organic material is preferably an isocyanate compound, an epoxy resin, or a melamine resin having two or more functional groups in the molecule. The second organic material may be any combination of two or more organic materials.

Examples of the isocyanate compound include aromatic polyisocyanates such as diphenylmethane diisocyanate (MDI) and tolylene diisocyanate (TDI); and aliphatic polyisocyanates such as hexamethylene diisocyanate (HDI). Examples may also include modified products of these polyisocyanates, such as a modified product containing carbodiimide or urethane, for example. Of these, aromatic polyisocyanates are preferred, and MDI is more preferred.

Any epoxy resin may be used as long as it is a resin having an epoxy ring. Examples thereof include bisphenol A epoxy resins, epoxy resins having a biphenyl skeleton, epoxy resins having a cyclopentadiene skeleton, and epoxy resins with a naphthalene skeleton.

Any melamine resin may be used as long as it is an organic nitrogen compound having a triazine ring at the center of the structure and three amino groups around the triazine ring. Examples thereof include alkylated melamine resin. Examples may also include modified products of melamine.

Preferably, the dielectric films are obtained by molding a resin solution containing the first organic material and the second organic material into films and curing the films by heat treatment.

When the dielectric films contain a thermoplastic resin as a main component, examples of thermoplastic resin include highly crystalline polypropylene, polyethersulfone, polyetherimide, and polyarylate.

The dielectric films contain additives that provide other functions. For example, addition of a leveling agent can provide smoothness. A more preferred additive is a material having a functional group that reacts with a hydroxyl group and/or an isocyanate group, which forms part of the cross-linked structure of the cured product. Examples of such a material include a resin having at least one functional group selected from the group consisting of epoxy groups, silanol groups, and carboxyl groups.

The dielectric films may have any thickness, but films that are too thin tend to be brittle. Thus, the thickness of each dielectric film is preferably more than 0.5 µm, more preferably 2 µm or more. Meanwhile, films that are too thick are susceptible to problems such as cracking during film formation. Thus, the thickness of each dielectric film is preferably less than 10 µm, more preferably 6 µm or less.

The thickness of the dielectric films can be measured by an optical film thickness gauge.

Second Embodiment

In a film capacitor according to a second embodiment of the present invention, as is the case with the first embodiment, the first outer electrode is connected to the first inner electrode and spaced apart from the second inner electrode, and the second outer electrode is connected to the second inner electrode and spaced apart from the first inner electrode. The second embodiment is different from the first embodiment in that the second inner electrode is provided on the second side of the first dielectric film.

Figure 8:
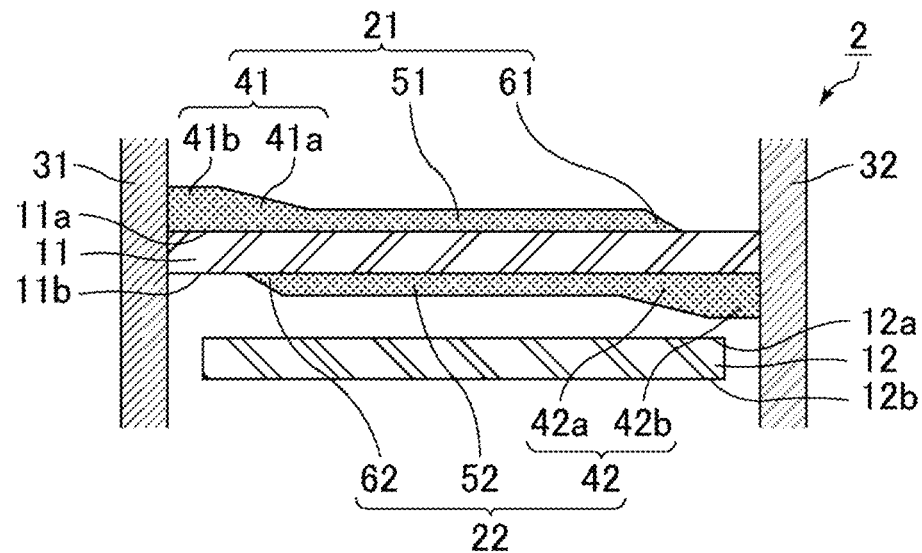
FIG. 8 is a schematic cross-sectional view of an example of a film capacitor according to a second embodiment of the present invention.

FIG. 8 is a schematic cross-sectional view of an example of the film capacitor according to the second embodiment of the present invention.

Although an overall configuration is not shown in FIG. 8, a film capacitor 2 includes the first dielectric film 11, the second dielectric film 12 laminated on the first dielectric film 11, and a first inner electrode 21 and a second inner electrode 22 opposing each other across the first dielectric film 11. The film capacitor 2 further includes a first outer electrode 31 connected to the first inner electrode 21 and spaced apart from the second inner electrode 22, and a second outer electrode 32 connected to the second inner electrode 22 and spaced apart from the first inner electrode 21.

In the film capacitor 2 shown in FIG. 8, as is the case with the film capacitor 1 shown in FIG. 1, the first inner electrode 21 is provided on the first side 11a of the first dielectric film 11. Unlike the film capacitor 1 shown in FIG. 1, the second inner electrode 22 is provided on the second side 11b of the first dielectric film 11. No inner electrode is provided on the second dielectric film 12.

As is the case with the film capacitor 1 shown in FIG. 1, the first inner electrode 21 includes the first connection portion 41 connected to the first outer electrode 31, the first main electrode portion 51 joined to the first connection portion 41, and the first thin portion 61 extending from the first main electrode portion 51 toward the second outer electrode 32. The first connection portion 41 includes the reduction region 41a where the thickness decreases from the first outer electrode 31 toward the first main electrode portion 51, and the flat region 41b where the thickness is constant. The second inner electrode 22 includes a second connection portion 42 connected to the second outer electrode 32, a second main electrode portion 52 joined to the second connection portion 42, and a second thin portion 62 extending from the second main electrode portion 52 toward the first outer electrode 31. The second connection portion 42 includes the reduction region 42a where the thickness decreases from the second outer electrode 32 toward the second main electrode portion 52, and the flat region 42b where the thickness is constant.

Preferably, the first inner electrode and the second inner electrode are formed by the methods shown in FIG. 5A and FIG. 5B. Preferably, the second connection portion is configured such that a side opposite to a side opposing the first thin portion across the first dielectric film is made of a material having a low electrical conductivity as compared to the side opposing the first thin portion across the first dielectric film. When the second inner electrode includes the second thin portion, preferably, the first connection portion is configured such that a side opposite to a side opposing the second thin portion across the first dielectric film is made of a material having a low electrical conductivity as compared to the side opposing the second thin portion across the first dielectric film.

Other configurations are as described in the first embodiment.

The second embodiment configured as described above also achieves similar effects as the first embodiment.

Third Embodiment

The film capacitor according to the third embodiment of the present invention is different from that in the first embodiment in that the first outer electrode and the second outer electrode are both connected to the second inner electrode and spaced apart from the first inner electrode. In the third embodiment, the second inner electrode is provided on the first side of the second dielectric film.

Figure 9:
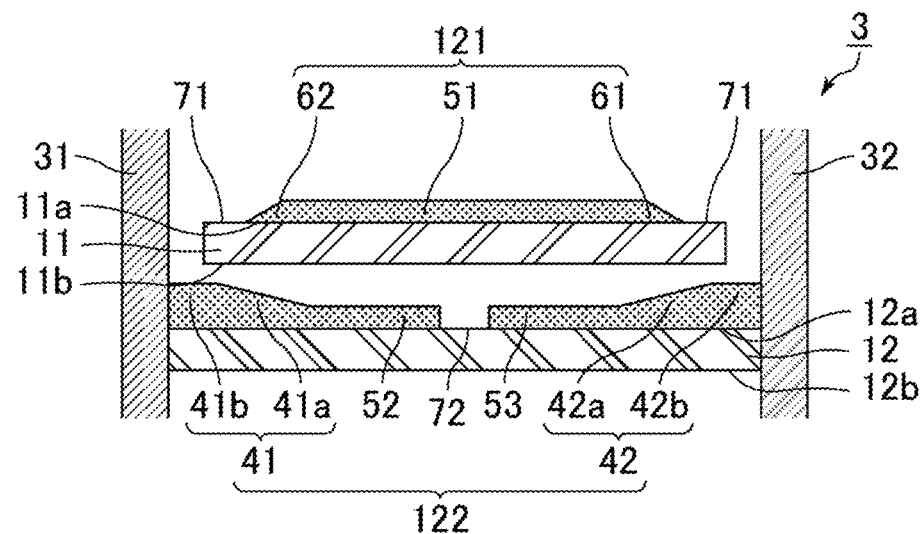
FIG. 9 is a schematic cross-sectional view of an example of a film capacitor according to a third embodiment of the present invention.

FIG. 9 is a schematic cross-sectional view of an example of the film capacitor according to the third embodiment of the present invention.

Although an overall configuration is not shown in FIG. 9, a film capacitor 3 includes the first dielectric film 11, the second dielectric film 12 laminated on the first dielectric film 11, and a first inner electrode 121 and a second inner electrode 122 opposing each other across the first dielectric film 11. The film capacitor 3 further includes the first outer electrode 31 connected to the second inner electrode 122 and spaced apart from the first inner electrode 121, and the second outer electrode 32 connected to the second inner electrode 122 and spaced apart from the first inner electrode 121.

The first inner electrode 121 is provided on the first side 11a of the first dielectric film 11. The first inner electrode 121 does not reach either one edge or the other edge of the first side 11a of the first dielectric film 11. Thus, the insulation margins 71 without the first inner electrode 121 are provided at both edges of the first side 11a of the first dielectric film 11.

The second inner electrode 122 is provided on the first side 12a of the second dielectric film 12. The second inner electrode 122 is separated into two parts on the first side 12a of the second dielectric film 12. Thus, the insulation margin 72 without the second inner electrode 122 is provided at a central portion of the first side 12a of the second dielectric film 12.

The first inner electrode 121 includes the first main electrode portion 51, the first thin portion 61 extending from the first main electrode portion 51 toward the second outer electrode 32, and the second thin portion 62 extending from the first main electrode portion 51 toward the first outer electrode 31. The first thin portion 61 is thinner than the first main electrode portion 51, and the second thin portion 62 is thinner than the first main electrode portion 51.

The second inner electrode 122 includes the first connection portion 41 connected to the first outer electrode 31, the second main electrode portion 52 joined to the first connection portion 41, the second connection portion 42 connected to the second outer electrode 32, and a third main electrode portion 53 spaced apart from the second main electrode portion 52 and joined to the second connection portion 42. The second main electrode portion 52 is thinner than the first connection portion 41, and the third main electrode portion 53 is thinner than the second connection portion 42. The first connection portion 41 includes the reduction region 41a where the thickness decreases from the first outer electrode 31 toward the second main electrode portion 52, and the flat region 41b where the thickness is constant. The second connection portion 42 includes the reduction region 42a where the thickness decreases from the second outer electrode 32 toward the third main electrode portion 53, and the flat region 42b where the thickness is constant.

In the first inner electrode 121, the first main electrode portion 51 opposes the second main electrode portion 52 and the third main electrode portion 53 across the first dielectric film 11 in the thickness direction of the first dielectric film 11. The first thin portion 61 opposes the reduction region 42a of the second connection portion 42 across the first dielectric film 11 in the thickness direction of the first dielectric film 11, and the second thin portion 62 opposes the reduction region 41a of the first connection portion 41 across the first dielectric film 11 in the thickness direction of the first dielectric film 11.

In the film capacitor according to the third embodiment of the present invention, the first inner electrode includes the first thin portion, and the first thin portion opposes the reduction region of the second connection portion across the first dielectric film.

In the film capacitor according to the third embodiment of the present invention, the first inner electrode may not include the second thin portion, but preferably, the first inner electrode includes the second thin portion, and the second thin portion opposes the reduction region of the first connection portion across the first dielectric film.

Preferably, the first inner electrode is formed by the method shown in FIG. 5A. Preferably, the second inner electrode is formed by the method shown in FIG. 5A and FIG. 5B. Preferably, the second connection portion is configured such that a side opposing the first thin portion across the first dielectric film is made of a material having a low electrical conductivity as compared to a side opposing the second dielectric film. When the first inner electrode includes the second thin portion, preferably, the first connection portion is configured such that a side opposing the second thin portion across the first dielectric film is made of a material having a low electrical conductivity as compared to a side opposing the second dielectric film.

Other configurations are as described in the first embodiment.

The third embodiment configured as described above also achieves similar effects as the first embodiment.

Fourth Embodiment

In the film capacitor according to the fourth embodiment of the present invention, as is the case with the third embodiment, the first outer electrode and the second outer electrode are both connected to the second inner electrode and spaced apart from the first inner electrode. The fourth embodiment is different from the third embodiment in that the second inner electrode is provided on the second side of the first dielectric film.

Figure 10:
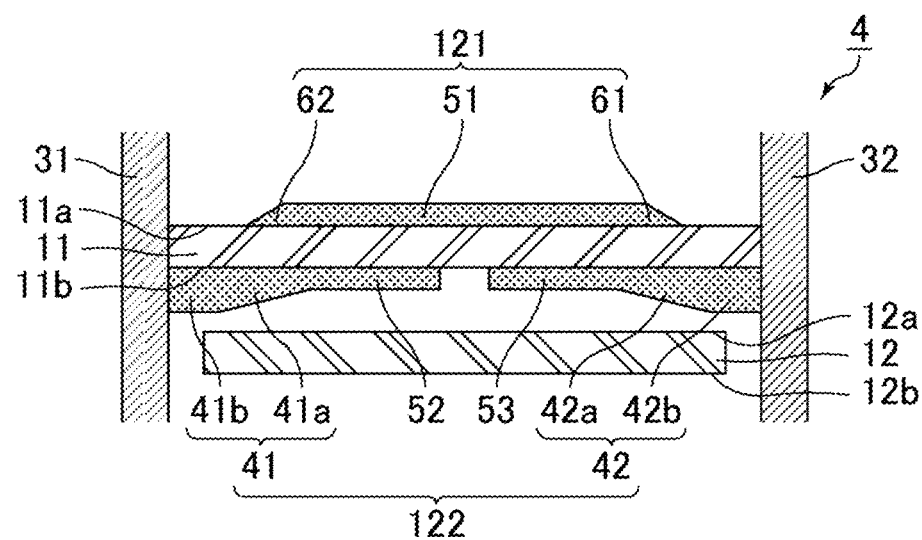
FIG. 10 is a schematic cross-sectional view of an example of a film capacitor according to a fourth embodiment of the present invention.

FIG. 10 is a schematic cross-sectional view of an example of the film capacitor according to the fourth embodiment of the present invention.

Although an overall configuration is not shown in FIG. 10, a film capacitor 4 includes the first dielectric film 11, the second dielectric film 12 laminated on the first dielectric film 11, and the first inner electrode 121 and the second inner electrode 122 opposing each other across the first dielectric film 11. The film capacitor 4 further includes the first outer electrode 31 connected to the second inner electrode 122 and spaced apart from the first inner electrode 121, and the second outer electrode 32 connected to the first inner electrode 121 and spaced apart from the second inner electrode 122.

In the film capacitor 4 shown in FIG. 10, as is the case with the film capacitor 3 shown in FIG. 9, the first inner electrode 121 is provided on the first side 11a of the first dielectric film 11. Unlike the film capacitor 3 shown in FIG. 9, the second inner electrode 122 is provided on the second side 11b of the first dielectric film 11. No inner electrode is provided on the second dielectric film 12.

As is the case with the film capacitor 3 shown in FIG. 9, the first inner electrode 121 includes the first main electrode portion 51, the first thin portion 61 extending from the first main electrode portion 51 toward the second outer electrode 32, and the second thin portion 62 extending from the first main electrode portion 51 toward the first outer electrode 31. The second inner electrode 122 includes the first connection portion 41 connected to the first outer electrode 31, the second main electrode portion 52 jointed to the first connection portion 41, the second connection portion 42 connected to the second outer electrode 32, and the third main electrode portion 53 spaced apart from the second main electrode portion 52 and jointed to the second connection portion 42. The first connection portion 41 includes the reduction region 41a where the thickness decreases from the first outer electrode 31 toward the second main electrode portion 52, and the flat region 41b where the thickness is constant. The second connection portion 42 includes the reduction region 42a where the thickness decreases from the second outer electrode 32 toward the third main electrode portion 53, and the flat region 42b where the thickness is constant.

Preferably, the first inner electrode is formed by the method shown in FIG. 5A. Preferably, the second inner electrode is formed by the methods shown in FIG. 5A and FIG. 5B. Preferably, the second connection portion is configured such that a side opposite to a side opposing the first thin portion across the first dielectric film is made of a material having a low electrical conductivity as compared to the side opposing the first thin portion across the first dielectric film. When the first inner electrode includes the second thin portion, preferably, the first connection portion is configured such that a side opposite to a side opposing the second thin portion across the first dielectric film is made of a material having a low electrical conductivity as compared to the side opposing the second thin portion across the first dielectric film.

Other configurations are as described in the third embodiment.

The fourth embodiment configured as described above also achieves similar effects to the first embodiment.

EXAMPLES

Examples that more specifically disclose the film capacitor of the present invention are described below. The present invention is not limited to these examples.

Production of Capacitor

Example 1

Aluminum was vapor-deposited on a 2.5-μm thick PP film while an insulation margin was formed by means of a non-vapor deposited portion on one end side of the film in a width direction. Subsequently, zinc was vapor-deposited on the other end side of aluminum vapor-deposited film. Thus, a connection portion having a 50-nm thick flat region (heavy edge) was formed. When vapor-depositing aluminum, a main electrode portion was made to have a thickness of 15 nm, and a 0.5-mm width inclined portion was formed as a thin portion on an edge side of the main electrode portion. When vapor-depositing zinc, a 2-mm width inclined portion was formed as a reduction region on the connection portion.

The inclined portion was formed by introducing metal vapor such that the amount of metal vapor decreases from a thicker side to a thinner side of the film during vapor-deposition.

Two metallized films thus obtained were stacked and wound together while an edge of the thin portion on the insulation margin side was aligned with a 30-nm thick portion of the inclined portion of the opposing connection portion. Thus, a capacitor (20 μF) of Example 1 was produced (see FIG. 1, FIG. 2, and FIG. 3).

Comparative Example 1

A metallized film was produced as in Example 1 except that the inclined portion was not formed. Two such metallized films were stacked and wound together while an edge of the main electrode portion on the insulation margin side was aligned with a flat portion of the opposing connection portion. Thus, a capacitor (20 μF) of Comparative Example 1 was produced.

Evaluation of Capacitor

The capacitors of Example 1 and Comparative Example 1 were each subjected to a withstand voltage test (105° C., 750 V, 24-hour application). Table 1 shows the results.

TABLE 1

| | Results of withstand voltage test (Number of capacitors with dielectric breakdown/number of tested capacitors) |
|---|---|
| Example 1 | 0 pcs/12 pcs |
| Comparative Example 1 | 3 pcs/12 pcs |

As shown in Table 1, none of the capacitors of Example 1 experienced dielectric breakdown, unlike the capacitors of Comparative Example 1. In the case of the capacitors of Comparative Example 1, when dielectric breakdown occurred, it always occurred at an overlapping portion between the end of one inner electrode and the connection portion of the other inner electrode.

Production of Capacitor

Example 2

Aluminum was vapor-deposited on a 3-μm thick thermo-setting film made of a prepolymer of polyvinyl acetoacetal (PVAA) and toluene diisocyanate (TDI) while an insulation margin was formed by means of a non-vapor deposited portion on one end side of the film in a width direction. Subsequently, zinc was vapor-deposited on the other end side of aluminum vapor-deposited film. Thus, a connection portion having a 40-nm thick flat region (heavy edge) was formed. When vapor-depositing aluminum, a main electrode portion was made to have a thickness of 10 nm, and a 0.5-mm width inclined portion was formed as a thin portion on an edge side of the main electrode portion. When vapor-depositing zinc, a 3-mm width inclined portion was formed as a reduction region on the connection portion.

Two metallized films thus obtained were stacked and wound together while an edge of the thin portion on the insulation margin side was aligned with a 20-nm thick portion of the inclined portion of the opposing connection portion. Thus, a capacitor (20 μF) of Example 2 was produced (see FIG. 1, FIG. 2, and FIG. 3).

Comparative Example 2

A metallized film was produced as in Example 2 except that the inclined portion was not formed. Two such metallized films were stacked and wound together. Thus, a capacitor (20 μF) of Comparative Example 2 was produced.

Evaluation of Capacitor

The capacitors of Example 2 and Comparative Example 2 were each subjected to a withstand voltage test (125° C., 750 V, 24-hour application). Table 2 shows the results.

TABLE 2

| | Results of withstand voltage test (Number of capacitors with dielectric breakdown/number of tested capacitors) |
|---|---|
| Example 2 | 0 pcs/12 pcs |
| Comparative Example 2 | 5 pcs/12 pcs |

As shown in Table 2, none of the capacitors of Example 2 experienced dielectric breakdown, unlike the capacitors of Comparative Example 2. In the case of the capacitors of Comparative Example 2, when dielectric breakdown occurred, it always occurred at an overlapping portion between the end of one inner electrode and the connection portion of the other inner electrode.

REFERENCE SIGNS LIST 1, 2, 3, 4 film capacitor
11 first dielectric film
11a first side of first dielectric film
11b second side of first dielectric film
12 second dielectric film
12a first side of second dielectric film
12b second side of second dielectric film
21, 121 first inner electrode
21a fuse portion of first inner electrode
21b insulation slit of first inner electrode
21c split electrode of first inner electrode
21A first metal deposited film
21B second metal deposited film
22, 122 second inner electrode
22a fuse portion of second inner electrode
22b insulation slit of second inner electrode
22c split electrode of second inner electrode
31 first outer electrode
32 second outer electrode
41, 141, 241, 341, 441, 541 first connection portion
41a, 141a, 241a, 341a, 441a, 541a reduction region of first connection portion
41b flat region of first connection portion
42 second connection portion
42a reduction region of second connection portion
42b flat region of second connection portion
51 first main electrode portion
52 second main electrode portion
53 third main electrode portion
61, 161, 261, 361, 461, 561 first thin portion
62 second thin portion
71, 72 insulation margin
$L_{41a}$ length of reduction region of first connection portion
$L_{42a}$ length of reduction region of second connection portion
$L_{61}$ length of first thin portion
$L_{62}$ length of second thin portion
$T_{41}$ maximum thickness of first connection portion
$T_{42}$ maximum thickness of second connection portion
$T_{51}$ maximum thickness of first main electrode portion
$T_{52}$ maximum thickness of second main electrode portion

The invention claimed is:

1. A film capacitor comprising:
a first dielectric film having a first side and a second side opposite to the first side;
a second dielectric film having a first side and a second side opposite to the first side, the second dielectric film being arranged such that the first side of the second dielectric film opposes the second side of the first dielectric film;
a first inner electrode on the first side of the first dielectric film, the first inner electrode including a first connection portion, a first main electrode portion having a constant or substantially constant thickness and joined to the first connection portion and thinner than the first connection portion, and a first thin portion extending from the first main electrode portion and thinner than the first main electrode portion;
a second inner electrode between the first dielectric film and the second dielectric film, the second inner electrode including a second connection portion and a second main electrode portion having a constant or substantially constant thickness and joined to the second connection portion and thinner than the second connection portion, the second connection portion including a reduction region having a thickness that decreases from the second connection portion toward the second main electrode portion;
a first outer electrode on a first end face of a laminate of the first dielectric film and the second dielectric film, the first outer electrode being electrically connected to the first connection portion of the first inner electrode and spaced apart from the second inner electrode; and
a second outer electrode on a second end face of the laminate, the second outer electrode being electrically connected to the second connection portion of the second inner electrode and spaced apart from the first inner electrode,
wherein the first main electrode portion opposes the second main electrode portion across the first dielectric film, and
the first thin portion opposes the reduction region of the second connection portion across the first dielectric film.

2. The film capacitor according to claim 1, wherein the second internal electrode is on the first side of the second dielectric film.

3. The film capacitor according to claim 1, wherein the second internal electrode is on the second side of the first dielectric film.

4. The film capacitor according to claim 1,
wherein the second inner electrode further includes a second thin portion extending from the second main electrode portion toward the first outer electrode and thinner than the second main electrode portion,
the first connection portion includes a reduction region having a thickness that decreases from the first outer electrode toward the first main electrode portion, and the second thin portion opposes the reduction region of the first connection portion across the first dielectric film.

5. The film capacitor according to claim 1, wherein a cross section of the reduction region of the second connection portion in a lamination direction of the first dielectric film and the second dielectric film has a tapered shape.

6. The film capacitor according to claim 5, wherein a cross section of the first thin portion in the lamination direction of the first dielectric film and the second dielectric film has a tapered shape in which a thickness thereof decreases from the first main electrode portion toward the second outer electrode.

7. The film capacitor according to claim 1, wherein a maximum total thickness of the reduction region of the second connection portion and the first thin portion opposing each other across the first dielectric film is smaller than a difference between a maximum thickness of the second connection portion and a maximum thickness of the second main electrode portion.

8. The film capacitor according to claim 1, wherein the second connection portion opposing an end of the first thin portion closest to the second outer electrode has a thickness that is more than one time and not more than two times a maximum thickness of the second main electrode portion.

9. The film capacitor according to claim 1, wherein the reduction region of the second connection portion is longer than the first thin portion in a direction from the first outer electrode toward the second outer electrode.

10. The film capacitor according to claim 9, wherein the first thin portion is within the reduction region of the second connection portion when viewed from a lamination direction of the first dielectric film and the second dielectric film.

11. The film capacitor according to claim 1, wherein the second connection portion is made of a material having a lower electrical conductivity than a material of the first thin portion.

12. The film capacitor according to claim 1,
wherein the second inner electrode is on the first side of the second dielectric film, and
the second connection portion is configured such that a side thereof opposing the first thin portion across the first dielectric film is made of a material having a lower electrical conductivity than a material of a side thereof opposing the second dielectric film.

13. The film capacitor according to claim 11,
wherein the second connection portion is made of a material containing zinc as a main component thereof, and
the first thin portion is made of a material containing aluminum as a main component thereof.

14. The film capacitor according to claim 1,
wherein the first dielectric film contains a first curable resin as a main component thereof, and
the second dielectric film contains a second curable resin as a main component thereof.

15. A film capacitor comprising:
a first dielectric film having a first side and a second side opposite to the first side;
a second dielectric film having a first side and a second side opposite to the first side, the second dielectric film being arranged such that the first side of the second dielectric film opposes the second side of the first dielectric film;
a first inner electrode on the first side of the first dielectric film, the first inner electrode including a first main electrode portion and a first thin portion having a constant or substantially constant thickness and extending from the first main electrode portion and thinner than the first main electrode portion;
a second inner electrode between the first dielectric film and the second dielectric film, the second inner electrode including a first connection portion, a second main electrode portion having a constant or substantially constant thickness and joined to the first connection portion and thinner than the first connection portion, a second connection portion, and a third main electrode portion having a constant or substantially constant thickness and spaced apart from the second main electrode portion and joined to the second connection portion and thinner than the second connection portion, the second connection portion including a reduction region having a thickness that decreases from the second connection portion toward the third main electrode portion;
a first outer electrode on a first end face of a laminate of the first dielectric film and the second dielectric film, the first outer electrode being electrically connected to the first connection portion of the second inner electrode and spaced apart from the first inner electrode; and
a second outer electrode on a second end face of the laminate, the second outer electrode being electrically connected to the second connection portion of the second inner electrode and spaced apart from the first inner electrode,
wherein the first main electrode portion opposes the second main electrode portion and the third main electrode portion across the first dielectric film, and
the first thin portion opposes the reduction region of the second connection portion across the first dielectric film.

16. The film capacitor according to claim 15,
wherein the first inner electrode further includes a second thin portion extending from the first main electrode portion toward the first outer electrode and thinner than the first main electrode portion,
the first connection portion includes a reduction region having a thickness that decreases from the first outer electrode toward the second main electrode portion, and
the second thin portion opposes the reduction region of the first connection portion across the first dielectric film.

17. The film capacitor according to claim 15, wherein the second internal electrode is on the first side of the second dielectric film.

18. The film capacitor according to claim 15, wherein the second internal electrode is on the second side of the first dielectric film.

19. The film capacitor according to claim 15, wherein the second connection portion is made of a material having a lower electrical conductivity than a material of the first thin portion.

20. The film capacitor according to claim 19, wherein
the second connection portion is made of a material containing zinc as a main component thereof, and
the first thin portion is made of a material containing aluminum as a main component thereof.

* * * * *